July 6, 1937.  M. I. DORFAN  2,086,354
METHOD AND APPARATUS FOR CLEANING GASES
Filed Feb. 28, 1936  2 Sheets-Sheet 2

INVENTOR
Morton I. Dorfan
by his attorneys
Stebbins Blenko & Parmelee

Patented July 6, 1937

2,086,354

UNITED STATES PATENT OFFICE 2,086,354

METHOD AND APPARATUS FOR CLEANING GASES

Morton I. Dorfan, Pittsburgh, Pa., assignor to Blaw-Knox Company, Blawnox, Pa., a corporation of New Jersey Application February 28, 1936, Serial No. 66,227

12 Claims. (Cl. 266—19)

This invention relates to the handling of gases and is adapted particularly for use in connection with apparatus for carrying out metallurgical reactions in the presence of heat.

A specific application of the invention is the collection of gases evolved in the reduction of metallic ores, although it is not limited thereto. It has been previously proposed to collect the gases emanating from the retorts usually employed in roasting furnaces in which certain types of ores, for example, that of zinc, are reduced. The collection of such gases is important because of the noxious character thereof and the possible danger to workmen in the vicinity and also because valuable solids, either the metal of the ore being reduced or compounds thereof are entrained in the gases.

The cost of installing and maintaining apparatus for handling gases is determined in large part by the capacity for which the apparatus is designed. For this reason, it is an object of my invention to provide a system for handling the gases discharged from apparatus wherein a metallurgical reaction is carried on, with as little admixture of atmospheric air as possible, considering the necessity for cooling the space adjacent the furnace by inflow of fresh air sufficiently to permit workmen to operate in the vicinity with a fair degree of comfort.

In accordance with my invention, I provide a passage extending along the side of a furnace and at a small elevation thereabove. Baffles adjacent the bottom of the passage extend downwardly therefrom toward the side of the furnace. I provide means for inducing a draft through the passage and a suitable filtering or separating mechanism. I so control the flow of gases between the baffles by independent dampers as to ensure thorough removal of the gases discharged from the furnace, with the admixture of only sufficient air to cool the space adjacent the furnace to a reasonable working temperature and supply fresh air for the operators. The invention thus operates to stratify, to some extent, the gases flowing upwardly from the side of the furnace and the air from the space thereadjacent.

My invention also contemplates that easy removal of certain solids from furnace gases requires that the temperature of the gases be above a predetermined value. Zinc chloride, for example, becomes deliquescent below 225° F. and this characteristic renders difficult the separation of the oxide from the accompanying gases. For this reason, I provide means for adding heat to the gases, if necessary, prior to their delivery to the filtering or separating mechanism.

It is usually necessary that one or both ends of the space alongside a roasting furnace be unobstructed. This would permit gases from the furnace to flow outwardly of the ends of the furnace enclosure. I provide means for creating an air curtain at the ends of the space alongside the furnace to preclude such outflow.

A preferred embodiment and practice of my invention will now be described in detail, referring to the accompanying drawings, for purposes of illustration, although it will be recognized that the showing of the drawings is by way of example only, both as to the structure involved and the steps of procedure indicated.

In the drawings:

Fig. 3 is a partial end elevation of the furnace enclosure with parts omitted;

Figure 1:
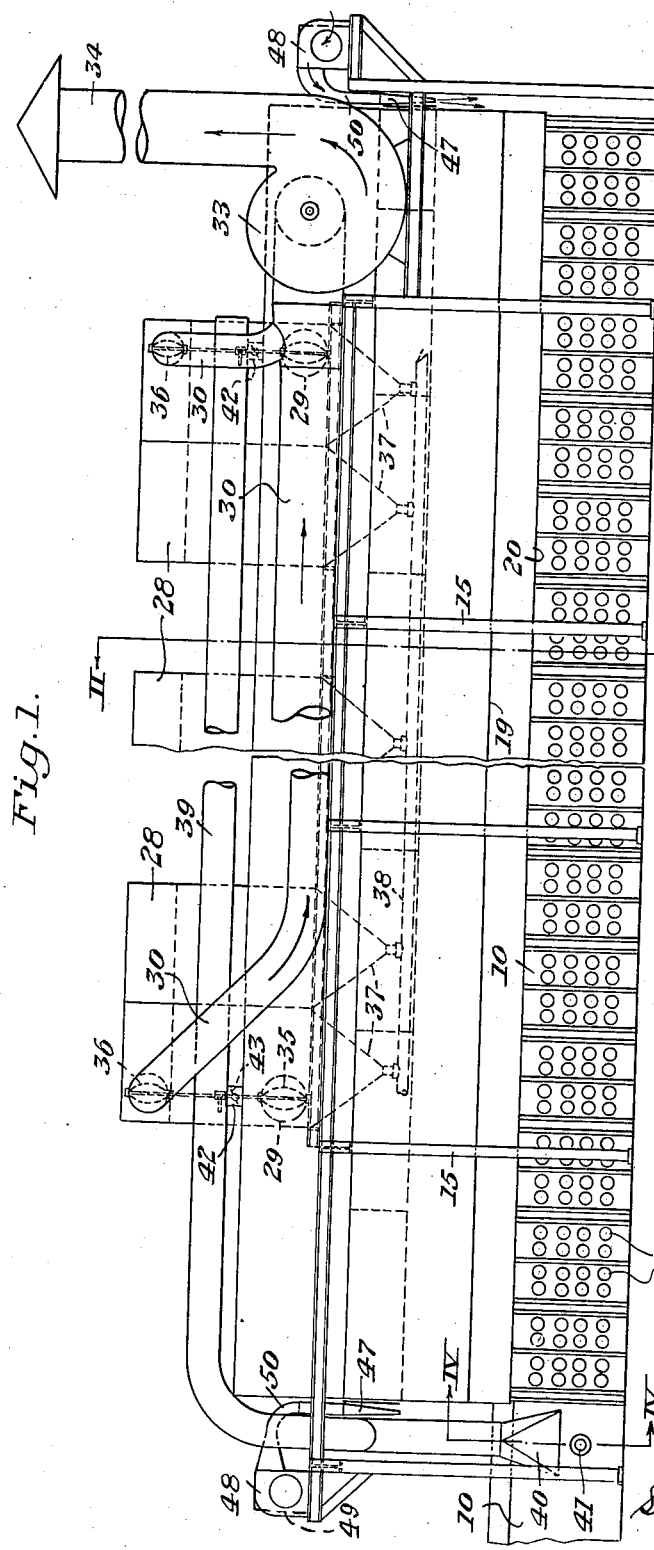
Figure 1 is a side elevation, partly broken away, of a furnace adapted for the roasting of metallic ore in individual retorts.
Figure 2:
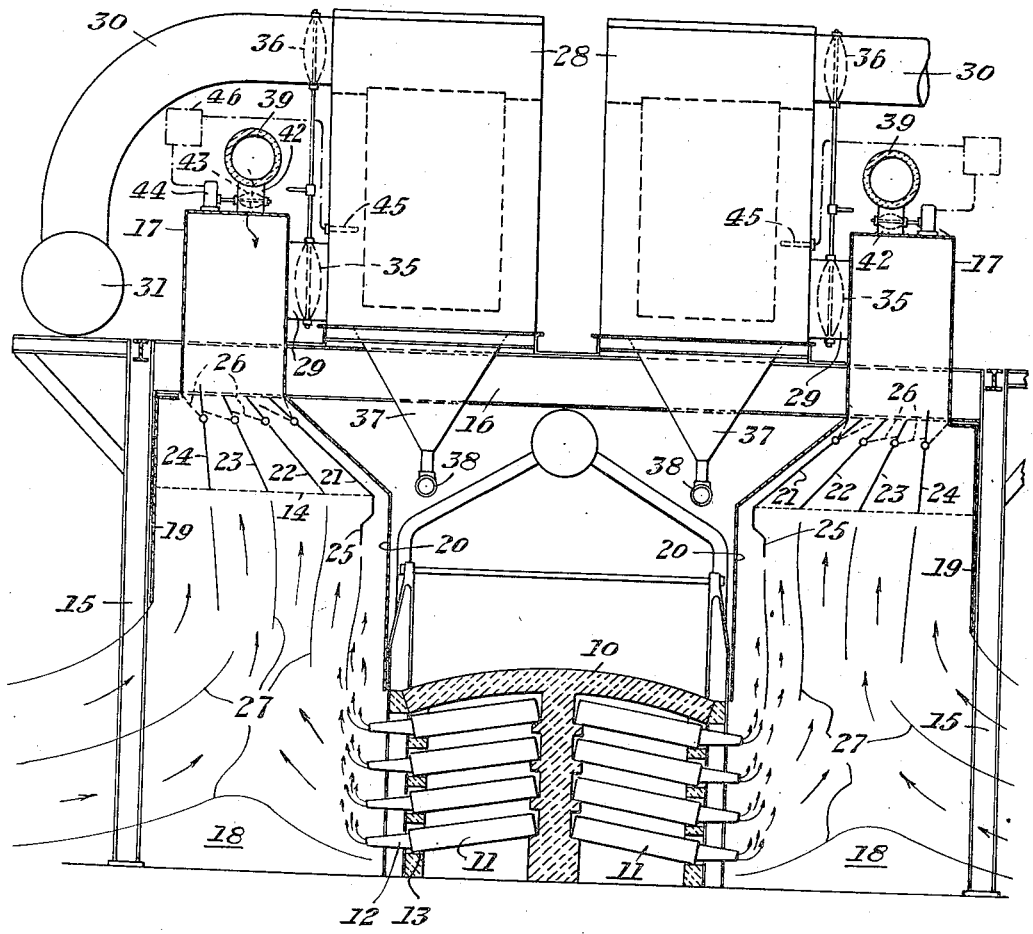
Fig. 2 is a partial transverse sectional view taken along the plane of line II—II of Fig. 1.
Figure 4:
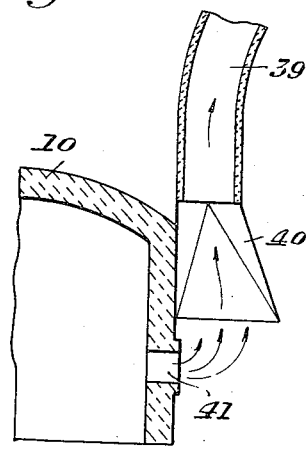
Fig. 4 is a partial sectional view taken along the line IV—IV of Fig. 1.
Figure 5:
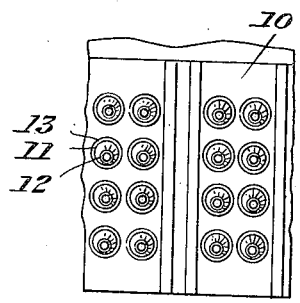
Fig. 5 is a partial side elevation of the furnace to enlarged scale, showing the retorts therein.

Referring now in detail to the drawings, a furnace 10 of usual construction is adapted to receive a plurality of individually removable retorts 11 having necks 12 adapted to extend outwardly through holes 13 in the side walls of the furnace. The retorts are charged with a mixture of ore and a reducing agent and are heated by the passage of hot gases longitudinally through the furnace. These gases may be provided by any suitable type of burner (not shown).

The charging of the retorts and the removal of the metal therefrom is accomplished by mechanism adapted to travel alongside the furnace. For this reason, it is essential to maintain the space alongside the furnace free of obstruction, at least to the height indicated by dotted line 14, and to position columns 15 supporting auxiliary apparatus to be described shortly at a suitable distance from the sides of the furnace.

Cross-beams 16 extend between columns 15. A sheet metal gas passage 17 extends along each side of the furnace 10. The passages 17 are carried on the beams 16 and generally overlie the working spaces 18 along the sides of the furnace. The outer side walls of the passages 17 have downwardly extending aprons 19 while the inner walls extend downwardly as at 20 to the top of the furnace 10. Longitudinal baffles or guide vanes 21, 22, 23 and 24 are disposed between the aprons 19 and the downward wall extensions 20. The baffles 21 have portions 25 depending below the elevation indicated by the dotted line 14. Individually operable dampers 26 are disposed between each pair of baffles or between the outer baffles and the apron 19 or wall extension 20. These dampers make it possible to control the upward flow of gases and air from the space 18 between the baffles and into the passages 17 so that substantially all the gases will be collected, but only sufficient atmospheric air to cool the space 18 to a proper working temperature and supply fresh air for the workmen.

It will be apparent that the gases issuing from the necks 12 of the retorts 11 will be at a high temperature and combustion of these gases usually occurs after they have been discharged from the retorts. The gases issuing from the retorts become progressively cooled by diffusion with the atmosphere. Immediately upon their discharge, the gases are at such a high temperature that there is a considerable natural draft upward resulting. At points more remote from the mouths of the necks 12, the gases have been cooled to a greater or less extent and the natural upward draft is lessened. By positioning the baffles, as shown, and by suitable adjustments of the dampers 26, it is possible to cause the gases issuing from the retorts, and the atmospheric air from outside the furnace enclosure, to flow upwardly toward the passage 17 along uniform smooth lines of flow as indicated at 27. The baffles serve to stratify the upflowing gases and air, in somewhat the manner indicated by the flow lines 27 although there is constant diffusion, of course, between adjacent strata. The upflow of gases and air results not only from the natural draft created by the hot gases, but also by reason of a slight vacuum maintained in the passages 17 by means to be described later.

From the passages 17, the dust or fume laden gases mixed with a minimum amount of air to cause proper cooling of the space 18 and to supply sufficient fresh air thereto, are delivered to any suitable filtering or separating means indicated generally at 28. The specific form of such means may vary widely and since various devices of this type are known, a detailed description thereof is omitted.

The filtering or separating devices 28 are preferably located above the furnace 10 and may conveniently be supported on the beams 16, although they may be located wherever desirable or convenient. Connections 29 are provided between the passages 17 and the devices 28. Outlet connections 30 from the devices 28 lead to headers 31 supported on brackets 32 carried on columns 15. The headers 31 are connected to induced draft fans 33 discharging to the atmosphere through stacks 34. The fans 33 produce a suction or vacuum through headers 31, connections 30, devices 28 and the passages 17 whereby to cause a strong upflow of the gases discharged by the furnace and the air on each side thereof. Inlet and outlet dampers 35 and 36 are disposed in connections 29 and 30, respectively. By these dampers the flow of gas to any filtering device may be controlled or shut off.

Collecting hoppers 37 and pipes 38 are associated with the separating or filtering devices 28 to facilitate gathering the solids separated from the gases.

If the temperature of the gases flowing into the separating devices 28 is below a predetermined value, for any reason, such as the atmospheric temperature, filtration may prove difficult. To avoid this, I provide hot gas pipes 39, preferably lagged with thermal insulating material for delivering hot gases to the passages 17 at various points therealong. The pipes 39 are disposed above and extend along the passages 17. One end of each of the pipes extends downwardly to a collecting hood 40 disposed above an outlet port 41 in the side wall of the furnace 10. Connections 42 between the pipes 39 and the passages 17 are provided at intervals. Dampers 43 in these passages control the flow of hot gases from the pipes 39 into the passages 17. The suction produced by the fans 33 is sufficient to cause inflow of the hot gases when the dampers 43 are opened. The dampers 43 are operated by motors 44. The motors 44 are controlled by thermostats 45 and automatic control panels 46. The thermostats 45 are mounted in the several filtering or separating devices 28 and each operates to open the damper 43 in the connection 29 to its particular filtering device, when the temperatures of the gas flowing thereinto is below a predetermined value. Thus if the temperature of the gases entering the particular filtering device is below such value the thermostat causes the motor 44 to open the damper 43 adjacent the inlet of that filtering device to add hot combustion gases from the furnace to the air and gases in the passage 17.

At each end of the furnace, I provide a plurality of downwardly extending nozzles 47. These nozzles have a width which is many times their depth and are disposed side by side as shown by Fig. 3. Blowers 48 supply air to headers 49 to which the nozzles 47 are connected by pipes 50. With the blowers 48 in operation the nozzles 47 are effective to create downwardly moving curtains of air at each end of the furnace. This prevents the gases discharged from the retorts from flowing outwardly through the open ends of the spaces 18. As an alternative to the air curtains, the baffles 21 through 24 and the passages 17 may be extended outwardly for a short distance beyond the ends of the furnace, to collect any outflow of gases.

It will be apparent from the foregoing that the invention provides a highly effective method and means for withdrawing gaseous products from the neighborhood of a heated reaction zone, together with sufficient air to cool the space adjacent the zone, so that operators can work comfortably therein, in an atmosphere of fresh air.

Since the amount of air drawn through the separating mechanisms with the dust laden gases is a minimum, the size of the apparatus and therefore its installation and maintenance cost are reduced. The apparatus shown need have a capacity only one-third to one-fourth that of previous gas handling equipment to accomplish the same results. The separating mechanisms are located above the furnace to prevent loss of heat and economize on floor space, although any other convenient location may be resorted to. The volume of gas or air flowing upwardly through any particular zone from alongside the furnace can be nicely controlled by the dampers disposed between the baffles. Accumulation of fumes in the working space is thus prevented, without requiring the handling of any larger volume of gas than necessary to accomplish this purpose. The reheating of the gas removed from adjacent the furnace, if necessary, facilitates the filtering or separating operation.

Although I have illustrated and described herein but one preferred apparatus and procedure, it will be understood that changes in either may be made without departing from the spirit of the invention or the scope of the appended claims.

I claim:—

1. Apparatus for collecting gaseous products discharged from the sides of a furnace into the space alongside the furnace and for cooling said space, comprising a passage extending along and above a side of the furnace, a plurality of baffles in said passage extending downwardly and toward said side of the furnace, and independent means for controlling the flow of gases between adjacent pairs of baffles.

2. A method of collecting gases from a space partly enclosed along the sides thereof but open at one end at least including the steps of withdrawing gases from the top of the space while directing an airblast across said open end.

3. Apparatus for collecting gases from the space alongside a furnace comprising walls enclosing said space along the sides thereof, at least one end of the space being open, means for directing an air curtain across said end, and means for withdrawing air and gases from the top of said space.

4. A method of handling vaporous products discharged from an ore roasting furnace, including the steps of withdrawing the products and the air adjacent the furnace in which they are suspended to a point above the furnace, stratifying the upward flow of the air and said products, and controlling the flow of each stratum individually to cause removal of substantially all said products from the space adjacent the furnace but only a minimum of the air from said space sufficient to maintain a good working temperature adjacent the furnace.

5. A method of cooling a space adjacent a heated reaction zone and collecting gaseous products evolved therein including the steps of withdrawing gas and air from said space, stratifying the flow of gas withdrawn, and controlling the flow in each stratum individually to induce substantially all said products but only sufficient air to maintain said space at a predetermined temperature by inflow thereinto of air from adjacent spaces.

6. Apparatus for collecting gases from the space alongside a furnace comprising walls enclosing said space along the sides thereof, at least one end of the space having an opening, and means effective to prevent outflow of gases from said end, said means terminating short of the bottom of the opening whereby to permit movement of mechanical elements therethrough.

7. A method of cooling a space adjacent a heated reaction zone and collecting gaseous products evolved therein including the steps of withdrawing gas from said space, inducing atmospheric air from adjacent said space, stratifying the flow of gas withdrawn and controlling the flow in each stratum individually to induce substantially all said products but only sufficient atmospheric air from said space to maintain the latter at a predetermined temperature by the inflow of fresh cooler air, heating the mixture of gas and air and separating from the mixture any material entrained therewith.

8. A method as defined by claim 7 characterized by heating the mixture of gas and air by mixing hot gases therewith.

9. Apparatus for collecting gaseous products discharged from the sides of a furnace into the space alongside the furnace and for cooling said space, comprising a passage extending along and above a side of the furnace, a plurality of baffles in said passage extending downwardly and toward said side of the furnace, and independent means for controlling the flow of gases between adjacent baffles, means connected to said passage for separating from said gaseous products any material entrained therewith, means for inducing a flow of said products upwardly from said side of the furnace and through said separating means, said means being also effective to induce a flow of air from said space and to cause replacement thereof by fresh, cooler air, and means for admitting a heating medium to said passage to counteract the cooling effect of the air induced with said products.

10. An apparatus defined by claim 9 characterized by said last-mentioned means including a hot gas duct extending from the furnace and along said passage, and having connection therewith.

11. An apparatus defined by claim 9 characterized by means responsive to the temperature of the gases entering said separating means for controlling the supply of heating medium to said passage.

12. In a method of recovering fumes from a furnace, the steps including inducing a flow of fumes upwardly past the side of the furnace, dividing the flow into separate streams spaced at successively increasing distances from the side of the furnace, inducing atmospheric air from adjacent the side of the furnace, and guiding said separate streams along the same general path to prevent agitation of the induced fumes and thereby reduce the amount of atmospheric air induced therewith.

MORTON I. DORFAN.